US012145089B2

(12) United States Patent
Al-Khairy

(10) Patent No.: US 12,145,089 B2
(45) Date of Patent: Nov. 19, 2024

(54) IMPENDING BYPASS SWITCH WITH MAGNETIC SENSOR

(71) Applicant: PRATT & WHITNEY CANADA CORP., Longueuil (CA)

(72) Inventor: Issam Al-Khairy, Montréal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 581 days.

(21) Appl. No.: 17/351,822

(22) Filed: Jun. 18, 2021

(65) Prior Publication Data
US 2022/0401859 A1 Dec. 22, 2022

(51) Int. Cl.
| B01D 35/14 | (2006.01) |
| B01D 35/143 | (2006.01) |
| F01M 11/03 | (2006.01) |
| F02M 11/10 | (2006.01) |
| F02M 37/32 | (2019.01) |
| G01D 5/14 | (2006.01) |
| G01D 5/16 | (2006.01) |
| F01M 11/10 | (2006.01) |
| F02C 7/232 | (2006.01) |

(52) U.S. Cl.
CPC ......... *B01D 35/1435* (2013.01); *G01D 5/145* (2013.01); *G01D 5/16* (2013.01); *F01M 11/03* (2013.01); *F01M 11/10* (2013.01); *F02C 7/232* (2013.01); *F02M 37/32* (2019.01); *F05D 2260/607* (2013.01)

(58) Field of Classification Search
CPC ...... B01D 35/1435; G01D 5/145; G01D 5/16; F01M 11/03; F01M 11/10; F02C 7/232; F02M 37/32; F05D 2260/607

USPC .......................... 210/739, 741, 143
See application file for complete search history.

(56) References Cited

U.S. PATENT DOCUMENTS

| 3,323,649 | A | 6/1967 | Rosaen |
| 4,740,140 | A * | 4/1988 | Benson ................... F04B 49/22 |
| | | | 417/310 |
| 4,792,651 | A | 12/1988 | Whiting |
| 9,441,598 | B2 | 9/2016 | Futa et al. |
| 10,150,064 | B2 | 12/2018 | Klein et al. |
| 10,941,683 | B2 | 3/2021 | Poster |

(Continued)

FOREIGN PATENT DOCUMENTS

| DE | 4039351 A1 * | 6/1992 |
| EP | 0900329 | 7/2004 |
| EP | 3358147 | 8/2018 |

OTHER PUBLICATIONS

Machine generated English translation of DE 4039351, generated on Dec. 22, 2023.*

*Primary Examiner* — Fred Prince
(74) *Attorney, Agent, or Firm* — NORTON ROSE FULBRIGHT CANADA LLP

(57) ABSTRACT

An impending bypass switch includes a housing having a fluid inlet for admitting fluid into an interior of the housing. A piston is displaceable in the interior of the housing in response to a pressure variation of the fluid in the interior. A magnetic sensor is configured to receive a current and is fixedly mounted to the housing. A magnet is mounted to the piston to be displaced with the piston. Displacement of the magnet relative to the magnetic sensor causes a change in the current through the magnetic sensor. The change in the current is indicative of an impending bypass of a component.

20 Claims, 3 Drawing Sheets

(56) References Cited

U.S. PATENT DOCUMENTS

2003/0127384 A1* 7/2003 Kapur ............... B01D 35/147
210/416.5
2005/0016591 A1 1/2005 Griffiths et al.
2017/0340996 A1 11/2017 Jo et al.

* cited by examiner

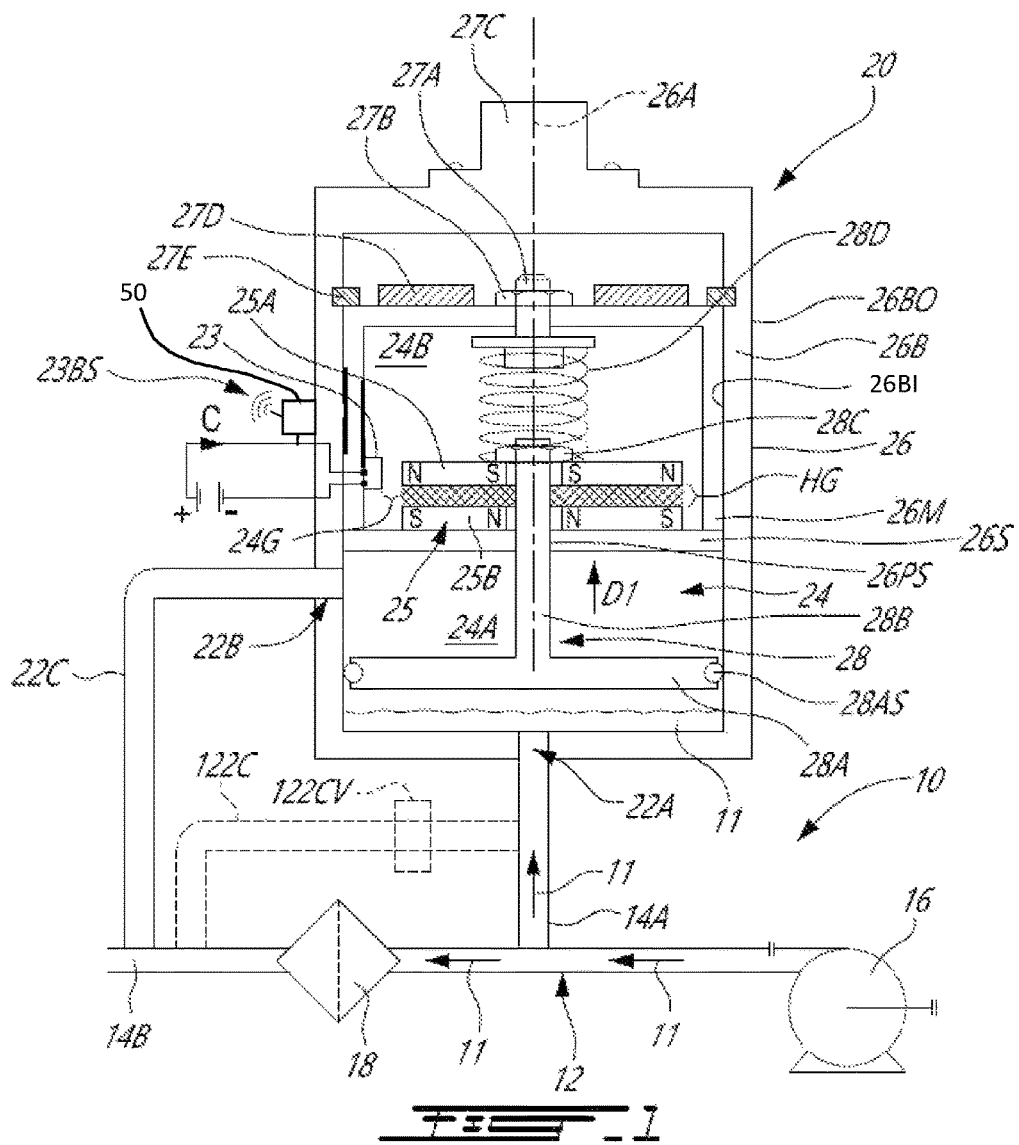
FIG. 1
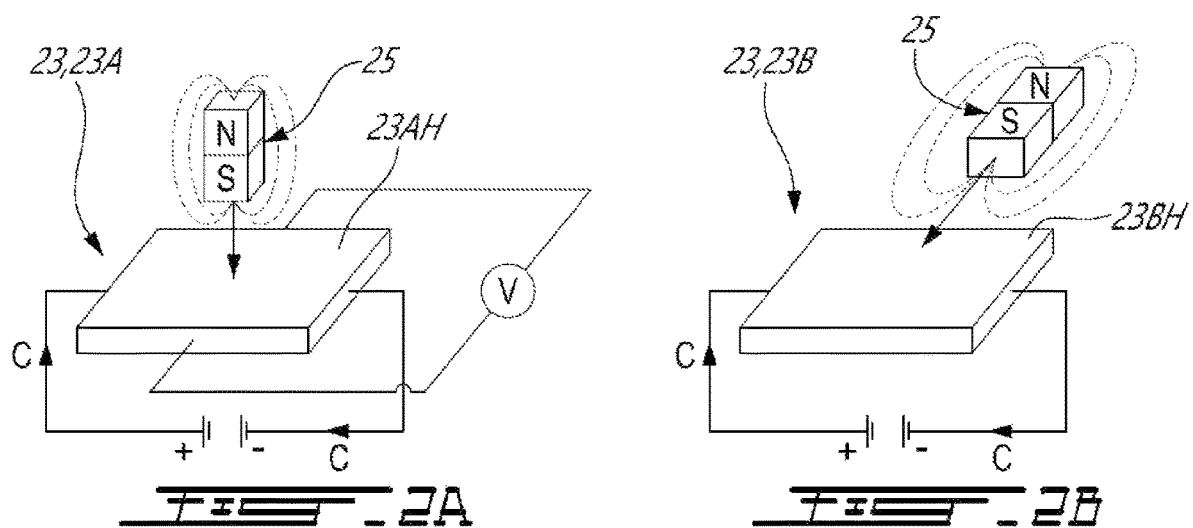
FIG. 2A
FIG. 2B

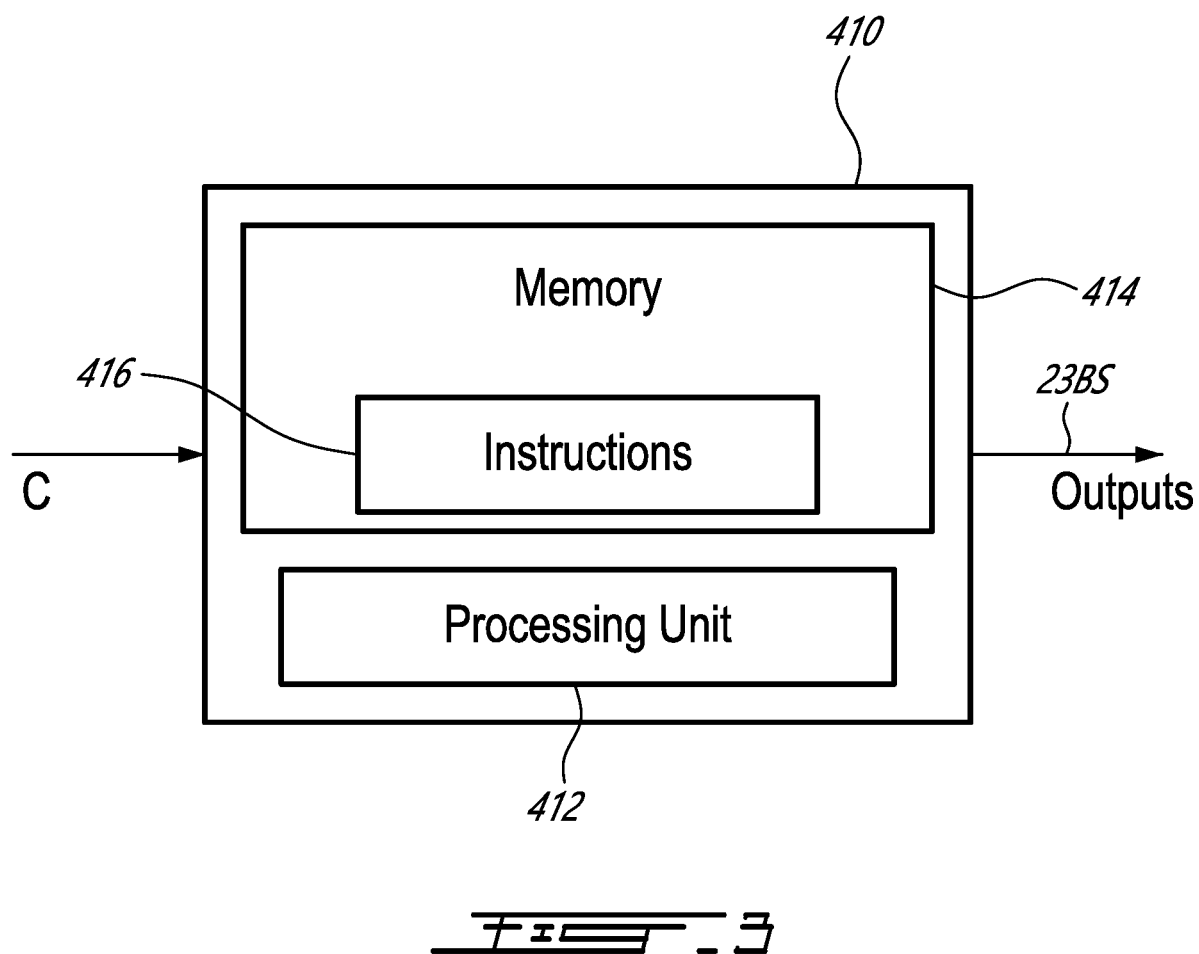

IMPENDING BYPASS SWITCH WITH MAGNETIC SENSOR

TECHNICAL FIELD

The application relates generally to fluid bypass devices and, more particularly, to impending bypass switches.

BACKGROUND

Impending bypass switches (IBS) are devices used to signal or warn of a forthcoming, or "impending", bypass of a fluidly-connected component, such as a filter, in response to variations in fluid pressure. Some IBS use moving components or electronic components which may be subject to wear, or which may experience vibrations when the IBS is operating. These factors may cause the IBS to emit signals warning of an impending bypass which are false.

SUMMARY

There is disclosed an impending bypass switch (IBS), comprising: a housing having a fluid inlet for admitting fluid into an interior of the housing; a piston displaceable in the interior of the housing in response to a pressure variation of the fluid in the interior; a magnetic sensor configured to receive a current and fixedly mounted to the housing; and a magnet mounted to the piston to be displaced with the piston, displacement of the magnet relative to the magnetic sensor causing a change in the current through the magnetic sensor, the change in the current indicative of an impending bypass of a component.

There is disclosed a fluid filter system, comprising: a fluid line including a fluid inlet line for conveying a fluid under pressure to a fluid filter, and a fluid outlet line for conveying the fluid downstream of the fluid filter; and an impending bypass switch (IBS), comprising: a housing having a fluid inlet in fluid communication with the fluid inlet line for admitting the fluid into an interior of the housing, the housing having a fluid outlet in fluid communication with the fluid outlet line; a piston displaceable in the interior of the housing in response to a pressure variation of the fluid in the interior; and a magnetic sensor configured to receive a current and fixedly mounted to one of the housing and the piston; and a magnet mounted to the other of the housing and the piston, displacement of the magnet relative to the magnetic sensor causing a change in the current through the magnetic sensor, the change in the current indicative of an impending bypass of the fluid filter.

There is disclosed a method of signaling an impending bypass of a filter, the method comprising: displacing a magnet due to fluid pressure build up caused by a blockage of the filter relative to a magnetic sensor having a current flowing therethrough, displacement of the magnet adjacent to the magnetic sensor changing the current through the magnetic sensor; and emitting a signal indicative of the impending bypass of the filter in response to the change in current through the magnetic sensor.

DESCRIPTION OF THE DRAWINGS

Reference is now made to the accompanying figures in which:

FIG. 1 is a schematic, partial cross-sectional view showing a possible configuration for a fluid filter system having an impending bypass switch;

FIG. 2A is a schematic view of a Hall effect sensor;

FIG. 2B is a schematic view of a magnetoresistive (MR) sensor;

FIG. 3 is a schematic representation of a computing device; and

DETAILED DESCRIPTION

Figure 4:
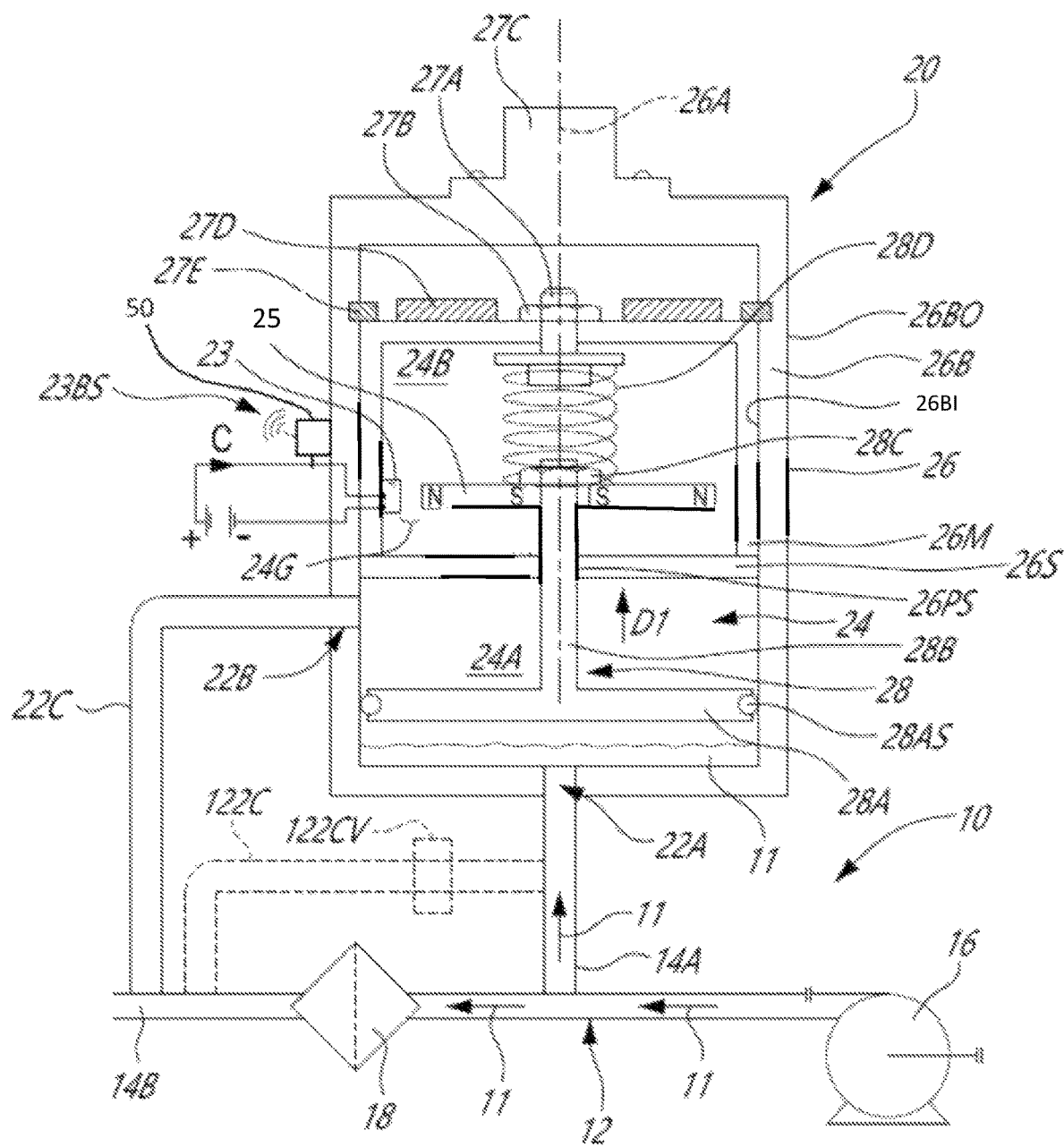
FIG. 4 is a schematic, partial cross-sectional view showing another possible configuration for a fluid filter system having an impending bypass switch.

FIG. 1 illustrates a fluid filter system 10 of a type for use in an engine or power plant, although the use of the fluid filter system 10 is possible in other machines or components. The fluid filter system 10 conveys a fluid 11 under pressure from one area of the engine to another area of the engine. The fluid 11 is conveyed through one or more fluid lines 12, from a fluid line inlet 14A to a fluid line outlet 14B. The fluid 11 is pressurized in the fluid line 12 by a pump 16. The pump 16 in FIG. 1 is shown as part of the fluid line inlet 14A to convey the fluid 11 under pressure through the fluid line inlet 14A to the fluid line outlet 14B.

The fluid 11 is filtered before and/or after being used. The fluid filter system 10 thus includes a filter 18 between the fluid line inlet 14A and the fluid line outlet 14B. The fluid 11 is conveyed under pressure through the fluid line inlet 14A and through the filter 18. The filter 18 removes matter or debris from the fluid 11 before the fluid 11 is conveyed downstream from the filter 18 through the fluid line outlet 14B.

The fluid 11 may be any fluid 11 used in the engine. For example, in one possible configuration, the fluid 11 is aircraft fuel 11 and the fluid filter system 10 is part of an aircraft fuel system. The fuel 11 is conveyed from a fuel tank in fluid communication with the fluid inlet line 14A. The fuel 11 flows through the filter 18 which removes matter or debris from the fuel 11 before it is it is conveyed through the fluid line outlet 14B to a fuel nozzle to be combusted. In another possible configuration, the fluid 11 is a lubricating fluid such as oil 11 and the fluid filter system 10 is part of an oil system. The oil 11 is conveyed from an oil reservoir, or from components that have been lubricated by the oil 11, which are in fluid communication with the fluid inlet line 14A. The oil 11 flows through the filter 18 which removes matter or debris from the oil 11 before it is it is conveyed through the fluid line outlet 14B to lubricate another component, or to return to an oil reservoir. Other types of fluids 11 may be used with the fluid filter system 10 disclosed herein.

During operation of the fluid filter system 10, it may occur that the filter 18 becomes partially or fully blocked by matter or debris. The fluid filter system 10 may thus include another component to warn or alert that the filter 18 is blocked, and/or to advise of a forthcoming blockage of the filter 18.

Referring to FIG. 1, the fluid filter system 10 includes an impending bypass switch 20. The impending bypass switch 20 (sometimes referred to herein as the "IBS 20") is downstream of the pump 16, and is in fluid communication with the fluid line inlet 14A to receive the fluid 11. The IBS 20 may be upstream of the filter 18, or parallel to the filter 18. As will be explained in greater detail below, the IBS 20 is responsive to blockages or malfunctions of the filter 18. These blockages or malfunctions may require the fluid 11 to be diverted, or to "bypass", the filter 18 in order to maintain operation of the components downstream of the fluid line outlet 14B. The IBS 20 alerts or warns of an upcoming, or "impending", bypass of the filter 18. This alert or warning from the IBS may be received by an engine operator or technician, so that they are made aware of a problematic blockage or malfunction of the filter 18, and so that they may perform corrective maintenance, repair or replacement of the filter 18. Thus, in FIG. 1, the IBS 20 is a "fluid-filter" IBS 20 because it is used to warn of an impending bypass of the filter 18. In other possible configurations, the IBS 20 is used to warn of an impending bypass of another engine component, such as a valve, caused by a blockage or malfunction of the other engine component. The IBS 20 may thus be used to warn of an impending bypass of other engine components as well.

Different possibilities for diverting the fluid 11 around the filter 18 are within the present disclosure. For example, and referring to FIG. 1, the bypass of the filter 18 is performed by the IBS 20. The IBS 20 has a fluid inlet 22A in fluid communication with the fluid line inlet 14A to receive the fluid 11. The fluid inlet 22A and the IBS 20 are mounted in parallel to the filter 18, so that the IBS 20 receives the fluid 11 at the same pressure at which the filter 18 receives the fluid 11. The IBS 20 has a fluid outlet 22B that is part of, or in fluid communication with, the fluid line outlet 14B. Referring to FIG. 1, the fluid outlet 22B is in fluid communication with a bypass line 22C which extends from the fluid outlet 22B to the fluid line outlet 14B, in order to convey the fluid 11 from the fluid outlet 22B to the fluid line outlet 14B and thus bypass the filter 18. The IBS 20 has an interior 24 for admitting the fluid 11 received from the fluid line inlet 14A via the fluid inlet 22A. The interior 24 is a sealed or impermeable internal volume of the IBS 20 which is in fluid communication with the fluid inlet 22A and/or with the fluid outlet 22B. The fluid outlet 22B is in fluid communication with the interior 24 of the IBS 20, and is also in fluid communication with the fluid inlet 22A, when the IBS 20 is performing the bypass of the filter 18, as explained in greater detail below. The fluid outlet 22B is thus downstream of the pump 16, and is used to convey the fluid 11 from the interior 24 to downstream of the filter 18 in a bypass situation. Referring to FIG. 1, the fluid inlet 22A and the fluid outlet 22B are defined in a housing 26 of the IBS 20. The housing 26 is a structure or body which forms the corpus of the IBS 20 and provides structure thereto. The housing 26 is partially or completely hollow, and defines the interior 24. In an embodiment, the fluid inlet and outlet 22A,22B are ports formed in walls of the housing 26. In the configuration shown in FIG. 1, the IBS 20 is thus a device which both warns of an impending bypass of the filter 18, and also allows for the fluid 11 to bypass the filter 18 in the event of a blockage or malfunction of the filter 18.

In another possible configuration of the IBS 20, the bypass of the filter 18 is performed away from, or outside of, the IBS 20. For example, and referring to FIG. 1, an alternative bypass line 122C extends from the fluid line inlet 14A directly to the fluid line outlet 14B. An inlet to the bypass line 122C is upstream of the fluid inlet 22A, and an outlet of the bypass line 122C is downstream of the filter 18. The bypass line 122C may have a valve 122CV downstream of the inlet to the bypass line 122C. The valve 122CV may be configured to open and to allow the fluid 11 to flow through the bypass line 122C so as to bypass the filter 18 when the pressure of the fluid 11 exceeds a set pressure of the valve 122CV. In such a configuration where the bypass of the filter 18 is performed outside of the IBS 20, the IBS 20 is free of a fluid outlet 22B. In such a configuration where the bypass of the filter 18 is performed outside of the IBS 20, the IBS 20 is free of a fluid outlet 22B that is in fluid communication with the fluid line outlet 14B. The IBS 20 may therefore, in some embodiments, have only the fluid inlet 22A.

Referring to FIG. 1, the IBS 20 has a piston 28. The piston 28 is positioned within the interior 24 of the housing 26. The housing 26 may thus be referred to as a "piston housing" or a "plunger housing". The piston 28 is displaceable relative to the housing 26. The piston 28 is displaceable within the interior 24 of the housing 26. In the configuration shown, the housing 26 is a cylindrical body which extends along a longitudinal axis 26A. The piston 28 is a body that translates in a linear direction that is parallel to the longitudinal axis 26A. The piston 28 is displaceable in response to a build up of pressure within the interior 24 of the IBS 20. For example, and referring to FIG. 1, the fluid 11 is pumped into the interior 24 via the fluid line inlet 14A and via the fluid inlet 22A. As less of the fluid 11 is conveyed through the filter 18 because of blockage or malfunction, more of the fluid 11 accumulates in the interior 24 and changes the pressure acting against piston 28. This increased pressure causes the piston 28 to displace in a direction D1 parallel to the longitudinal axis 26A.

The piston 28 may have any configuration or take any form to achieve the functionality ascribed to it herein. For example, and referring to FIG. 1, the piston 28 includes a piston head 28A or plunger mounted to a piston rod 28B. The piston head 28A and the piston rod 28B are fixedly mounted to each other and displace together as a single-unit relative to the housing 26. The piston rod 28B extends perpendicularly from the piston head 28A along a direction that is parallel to the longitudinal axis 26A, and that is parallel to the direction D1 of displacement of the piston 28. The piston head 28A engages an inner surface 26B1 of an annular wall 26B of the housing 26 defining the interior 24. The piston head 28A includes an annular peripheral seal 28AS which slidingly engages the inner surface 26B1 to seal off one side of the piston head 28A from the other. The fluid 11 is thus largely prevented from flowing through, or past, the piston head 28A by the seals 28AS, such that the build up of the fluid 11 in the interior 24 via the fluid inlet 22A will exert pressure on the piston head 28A and cause the piston 28 to displace relative to the housing 26. It is understood that, during normal or unblocked operation of the filter 18, the fluid 11 may also enter the interior 24 via the fluid outlet 22B by flowing through the fluid line outlet 14B and through the bypass line 22C. It therefore follows that it is the pressure differential across the piston head 28A (i.e. the difference in fluid pressure on one side of the piston head 28A versus the other side) which causes the piston head 28A and the piston rod 28B to translate. The piston 28 and/or the piston head 28A may be calibrated to displace in response to a predetermined pressure differential that is representative of a defined blockage of the filter 18, for example. The piston 28 may have other forms, and may sometimes be referred to as a "plunger". In an alternate embodiment, the IBS 20 has a diaphragm that is displaceable relative to the housing 26 in response to a pressure variation of the fluid 11 within the interior 24. Thus the term "piston" should be understood as covering other devices in the IBS 20 that are responsive to changes in fluid pressure.

The IBS 20 signals the impending bypass of the filter 18 as a result of electromagnetic components of the IBS 20. Referring to FIG. 1, the IBS 20 includes a magnetic sensor 23 and one or more magnets 25. The magnetic sensor 23 is a device through which an electric current C flows during operation of the IBS 20. The current C flowing through the magnetic sensor 23 responds to, or is changed by, a magnetic field generated by the magnets 25. The change in the current C through the magnetic sensor 23 may be detected or measured, and used to signal an impending bypass of the filter 18, as explained in greater detail below. Different types of magnetic sensors 23 may be used to achieve the functionality described herein, and are within the scope of the present disclosure.

For example, and referring to FIG. 2A, the magnetic sensor 23 is or includes a Hall effect sensor 23A. The electric current C flows through a Hall element 23AH, which is a semiconductor element in the embodiment shown. As the magnet 25 is brought nearer to the Hall element 23AH, the magnetic field of the magnet 25 exerts a force on the Hall element 23AH which deflects the charge carriers to the sides of the Hall element 23AH. This movement of charge carriers generates a potential difference and a measurable voltage called the Hall voltage. The detection of the Hall voltage, or the Hall voltage exceeding a predetermined value, may be measured or monitored to signal an impending bypass of the filter 18. In the Hall effect sensor 23A, the magnet 25 is displaced relative to the Hall element 23AH along a direction that is perpendicular to a plane defined by the Hall element 23AH.

Another possible type of magnetic sensor 23 is a magnetoresistive (MR) sensor 23B. Referring to FIG. 2B, the magnetic sensor 23 is or includes the MR sensor 23B. As with the Hall effect sensor 23A, the current C through the MR sensor 23B responds to changes in the external magnetic field generated by the magnet 25. The electric current C flows through a sensor element 23BH, which is a film in the embodiment shown. As the magnet 25 is brought nearer to the sensor element 23BH, the magnetic field of the magnet 25 exerts a force on the sensor element 23BH which changes its resistance. The change in resistance generates a varying current. The detection of this varying current, or the varying current exceeding a predetermined value, may be used to signal an impending bypass of the filter 18. In the MR sensor 23B, the magnet 25 is displaced relative to the sensor element 23BH along a direction that is parallel to a plane defined by the sensor element 23BH. Some types of MR sensors 23B that may be used include, but are not limited to, Anisotropic Magnet Resistance (AMR) sensors and giant magnetoresistance (GMR) sensors.

The magnetic sensor 23 and the magnet 25 are displaceable relative to each other. The magnetic sensor 23 and the magnet 25 translate relative to each other in a direction parallel to the longitudinal axis 26A to allow the IBS 20 to signal an impending bypass. This relative displacement may take different configurations. For example, and referring to FIG. 1, the magnetic sensor 23 is fixedly mounted to the housing 26 and the one or more magnets 25 are mounted to the piston 28 to be displaced with the piston 28 relative to the housing 26. By "fixedly mounted", it is understood that the magnetic sensor 23 does not displace when the IBS 20 is operating. By "fixedly mounted", it is understood that the magnetic sensor 23 does not displace relative to the housing 26. The fixed attachment of the magnetic sensor 23 may take different forms. For example, and referring to FIG. 1, the magnetic sensor 23 is fixedly mounted to the inner surface 26B1 of the annular wall 26B of the housing 26 which delimits the interior 24 of the housing 26. The magnet sensor 23 protrudes from the inner surface 26B1 into the interior 24. In an alternate embodiment, the magnetic sensor 23 is mounted to the annular wall 26B and is flush with the inner surface 26B1. In an alternate embodiment, the magnetic sensor 23 is mounted to an outer surface 26BO of the annular wall 26B and is thus located outside of the interior 24. In light of the preceding, it will be appreciated that different configurations for fixedly mounting the magnetic sensor 23 to the housing 26 are within the scope of the present disclosure.

In the configuration of FIG. 1, the magnetic sensor 23 is thus a "solid state" sensor because it does not contain any moving parts and because it does not move relative to the housing 26. In the configuration of FIG. 1, the magnetic sensor 23 is a "solid state" magnetic flux sensor that responds to changes in the magnetic flux from the magnet 25. More particularly, the current C flowing through the magnetic sensor 23 changes in response to changes in the magnetic flux of the magnet 25. This in contrast with some mechanisms known as "Reed switches" or micro-limit switches. In a Reed switch, a pair of ferromagnetic metal contacts in a sealed chamber are displaced toward each other to form a circuit when a magnetic field is present. Such Reed switches have sensitive moving parts (i.e. the pair of metal contacts) and may thus be subject to wear or malfunction when exposed to vibrations or during their installation. The solid state magnetic flux sensor 23 disclosed herein is free of moving parts, and is thus less susceptible to problems that may occur due to vibration or during installation of the magnetic sensor 23. The solid state magnetic flux sensor 23 disclosed herein is, or forms part of, a non-contact circuit where wiring for the magnetic sensor 23 is outside of the housing 26 and is thus less susceptible to problems that may occur due to vibration or during installation of the magnetic sensor 23.

In contrast to the fixed magnetic sensor 23, in the embodiment of FIG. 1, the magnet 25 displaces relative to the housing 26 with the piston 28. The magnet 25 may be mounted to any part of the piston 28 which permits the magnet 25 to be in close proximity to the magnetic sensor 23 during displacement of the piston 28. For example, and referring to FIG. 1, the magnet 25 is mounted to the piston rod 28B. A locknut 28C secures the magnet 25 to a radially-outer surface of the piston rod 28B such that the magnet 25 is displaced with the piston rod 28B. There is no relative displacement between the piston rod 28B and the magnet 25 in FIG. 1. The magnet 25 is thus an annular body, or a "ring" magnet 25, in FIG. 1. A spring 28D extends between the magnet 25 and a fixed part of the housing 26 to help calibrate the piston 28 and/or the piston head 28A to displace in response to a predetermined pressure differential that is representative of a defined blockage of the filter 18, for example. Other configurations for mounting the magnet 25 to the piston 28 are possible. For example, the magnet 25 may be mounted to the piston head 28A to be displaced with the piston head 28A. For example, the magnet 25 may be mounted to a platform that is fixedly mounted to the piston rod 28B, so as to be displaced with the piston rod 28B.

The magnet 25 is sealed from the fluid 11 in the interior 24 of the housing 26. The magnet 25 is fluidly isolated from any fluid 11 within the interior 24. This can be achieved in different ways. For example, and referring to FIG. 1, the housing 26 includes a seal 26S that engages the inner surface 26B1 of the annular wall 26B. The seal 26S creates a barrier within the interior 24 which prevents the passage of the fluid 11 therethrough. The seal 26S therefore divides the interior 24 into a wet portion 24A that can receive the fluid 11 and be exposed thereto, and a dry portion 24B that is not exposed to the fluid 11. The magnet 25 in FIG. 1 is located within the dry portion 24B of the interior 24, and is thus not exposed to the fluid 11 which may enter the interior 24. In the configuration of the housing 26 shown in FIG. 1, the seal 26S is fixedly mounted to the annular wall 26B, and has a seal passage 26SP through which the piston rod 28B is free to translate relative to the seal 26S while still preserving the barrier between the wet and dry portions 24A,24B. The seal 26S abuts against a movement limiter 26M on the inner surface 26B1 of the annular wall 26. The movement limiter 26M prevents additional axial displacement of the piston head 28A in the direction D1. In another possible configuration for sealing the interior 24, the seal 26S is fixedly mounted to the piston rod 28B and displaces with the piston rod 28B relative to the annular wall 26B. In yet another possible configuration for sealing the interior 24, the seal 26S is a peripheral seal mounted about a periphery of the ring magnet 25, such that the peripheral seal 26S displaces along the inner surface 26B1 as the magnet 25 displaces relative to the housing 26.

In an alternate embodiment, the magnetic sensor 23 is mounted to the piston 28 to be displaced therewith, and the magnet 25 is fixedly mounted to the housing 26. It will thus be appreciated that the magnet 25 may be mounted to one of the piston 28 and the housing 26, and that the magnetic sensor 23 may be mounted to the other of the housing 26 and the piston 28, provided that there is relative displacement between the magnet 25 and the magnetic sensor 23. In the embodiment where the magnetic sensor 23 is mounted to the moving piston 28, the magnetic sensor 23 is a moving magnetic flux sensor whose wiring may need to be reinforced in order to reduce damage or wear caused by vibrations.

Referring to FIG. 1, the magnetic sensor 23 and the magnet 25 are spaced apart from each other across a gap 24G. The gap 24G is a radial distance, measured relative to the longitudinal axis 26A, between the magnet 25 and the magnetic sensor 23. The gap 24G in the depicted embodiment is a portion of the interior 24, and more particularly, of the dry portion 24B. In FIG. 1, the gap 24G has a constant size that does not vary. In FIG. 1, the size of the gap 24G may be selected as a function of the magnetic flux intensity generated by the magnet 25 that is desired to be experienced by the current C through the magnetic sensor 23. The gap 24G is an annular gap 24G in FIG. 1. The volume of the gap 24G is more than one order of magnitude less than the volume of the dry portion 24B of the interior 24. The radial width of the annular gap 24G is more than one order of magnitude less than the radial width of the ring magnet 25. The gap 24G is thus small when compared to the size of the magnet 25, such that the magnet 25 and the magnetic sensor 23 are able to be positioned in close proximity to each other. The magnet 25 is thus spaced apart from the magnetic sensor 23 when displacing relative to the magnetic sensor 23, such that there is no contact between the magnet 25 and the magnetic sensor 23. The absence of contact between the electromagnetic components of the IBS 20 which allow for signalling an impending bypass helps to reduce wear on the IBS 20 and create a no-contact circuit.

The ability of the magnet 25 and the magnetic sensor 23 to be positioned in close proximity to each other allows for the displacement of the magnet 25 relative to the magnetic sensor 23 to change the electrical current C flowing through the magnetic sensor 23. By "change" the electric current C, it is understood that the current flowing constantly through the magnetic sensor 23 is altered by the magnetic field from the magnet 25 as the magnet 25 is displaced relative to the magnetic sensor 23, in such a manner as to allow the IBS 20 to signal an impending bypass of the filter 18. This change in the electric current may be achieved in different ways. For example, and referring to FIG. 1, in the embodiment where the magnetic sensor 23 is a Hall effect sensor 23A, the magnetic field of the magnet 25 exerts a force on the Hall element 23AH which deflects the charge carriers to the sides of the Hall element 23AH. This movement of charge carriers generates a potential difference and a measurable voltage called the Hall voltage. In another example, in the embodiment where the magnetic sensor 23 is an MR sensor 23B, the magnetic field of the magnet 25 exerts a force on the sensor element 23BH which changes its resistance. The change in resistance generates a varying current.

The change in the current C can be detected, measured and/or processed to cause the IBS 20 to emit an impending bypass signal 23BS. The impending bypass signal 23BS is representative of a change in the current C flow through the magnetic sensor 23, and the impending bypass signal 23BS may be processed or analysed to alert an engine control system or a human operator or a technician that a bypass of the filter 18 may soon occur.

Referring to FIG. 1, the IBS 20 includes a controller 50. The controller 50 measures or detects the change in current C through the magnetic sensor 23, and emits the impending bypass signal 23BS. The controller 50 may thus be a component of the IBS 20, or may be separate therefrom. By way of an example, the controller 50 may be positioned in the interior 24 away from moving parts of the housing 26 and isolated from the fluid 11, to receive input (i.e. the change in the current C) from the magnetic sensor 23, which may be communicatively coupled to the controller 50 in any suitable fashion. The controller 50 may receive instructions from an operator via the remote device, or may be operated on the basis of commands stored within or otherwise provided to the remote device. The controller 50 then processes the change in the current C in accordance with the commands.

Referring to FIG. 3, an example of a computing device 410 is illustrated. For simplicity, only one computing device 410 is shown; it should nevertheless be understood that multiple computing devices 410 operable to exchange data may be employed, as appropriate. The computing devices 410 may be the same or different types of devices. The controller 50, as well as one or more other portions of the IBS 20 may be implemented, in whole or in part, using one or more computing devices 410. The controller 50 and/or other portions of the IBS 20 may be implemented using physical computing devices, distributed computing devices, virtual computing devices (i.e., implemented within one or more virtual machines), or any suitable combination thereof.

The computing device 410 comprises a processing unit 412 and a memory 414 which has stored therein computer-executable instructions 416. The processing unit 412 may comprise any suitable devices configured to implement the functionality now described, in particular the emission of the impending bypass signal 23BS, such that the instructions 416, when executed by the computing device 410 or other programmable apparatus, may cause the functions/acts/steps described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Referring to FIG. 3, and as explained above, the processing unit 412 executes the instructions 416 to emit the impending bypass signal 23BS. The computing device 410 operates to receive inputs, such as the current C, or the Hall voltage in the embodiment where the magnetic sensor 23 is the Hall effect sensor 23A. The computing device 410 is thus communicatively coupled to the magnetic sensor 23 in any suitable manner. The computing device 410 operates to monitor and/or measure the change in current C or Hall voltage. It is therefore possible for the controller 50 to monitor the magnetic sensor 23 to identify changes in the current C that are indicative of an impending bypass of the filter 18. The computing device 410 may employ transistors, amplifiers or other devices to process the current C received from the magnetic sensor 23. The current C may then be compared to current values stored in the memory 414, and the instructions 416 may be executed by the processing unit 412 to determine if the current C received from the magnetic sensor 23 is different from the stored current values, exceeds a threshold current value, and/or is different from a previous current value stored in the memory 414, thereby indicating that the change in the current C is indicative of an impending bypass. The processing unit 412 then commands the instructions 416 to emit the impending bypass signal 23BS.

The impending bypass signal 23BS is processed by a control system or other computing device. The impending bypass signal 23BS may contain information about the impending bypass, such as the percent blockage of the filter 18, the number of cycles remaining before bypass occurs, or the estimated time remaining before the bypass occurs. The control system may process the impending bypass signal 23BS to provide this information, which may allow a technician to inspect, repair, or replace the filter 18 prior to bypass occurring. The information provided by the control system may be in any suitable audiovisual form, such as, but not limited to, a noise, a light, and/or an icon.

The perturbation or change in the current through the magnetic sensor 23 caused by the close presence of the magnet 25 can be processed or analyzed away from the moving parts of the IBS 20. For example, and referring to FIG. 1, the change in the current C may be detected or measured within or outside of the stationary housing 26, to thereby indicate that a bypass of the filter 18 is imminent or impending. The change in the current C may be amplified or filtered by the computing device 410 to remove noise or other undesirable information, such that the resulting information is emitted as the impending bypass signal 23BS.

The IBS 20 disclosed herein thus relies on a pressure differential across a piston 28/magnet assembly 23,25 so that movement of the magnet 25 is detected by the magnetic sensor 23 that is spaced apart from the magnet 25, due to the effect of the magnet 25 on the electrical circuit characteristics of the magnetic sensor 23, thereby indicating an impending bypass. The presence of the solid state magnetic sensor 23 fixedly mounted to the housing 26 results in a no-moving part, no-contact detection assembly, which is thus less susceptible to wear or malfunction caused by vibrations. The effect of engine vibrations and low circuit currents on the magnetic sensor 23 may thus be reduced or eliminated, leading to an increased part life, lower costs, and lower complexity.

Different configurations of the magnet 25 are possible to achieve this functionality and to allow the IBS 20 to emit the impending bypass signal 23BS. For example, and referring to FIG. 1, the piston 28 is displaceable between an initial position and a second position spaced apart from the initial position. The initial position of the piston 28 represents normal operation of the filter 18, in which the filter 18 is unblocked and allowing the fluid 11 to flow through. This initial position may be a default position of the magnet 25. The piston 28 in the second position is spaced apart from the piston 28 in the initial position along a direction parallel to the longitudinal axis 26A. The piston 28 has been displaced from the initial position to the second position by the build up of fluid pressure in the wet portion 24A of the housing 26 caused by blockage of the filter 18. This pressure build up creates a pressure differential across the piston head 28A, causing it to displace in the direction D1 and consequently displace the magnet 25. The second position of the piston 28 is thus representative of an impending bypass of the filter 18.

The piston 28 is shown in FIG. 1 in its initial position. In the initial position of the piston 28, the magnet 25 is aligned with the magnetic sensor 23 across the gap 24G. In the initial position of the piston 28, the magnet 25 lies in the same plane as the magnetic sensor 23, where the plane is defined normal to the longitudinal axis 26A. In the initial position, the magnet 25 has a first polarity, for example north pole. The first polarity of the magnet 25 in the initial position may impart an effect on the current C through the magnetic sensor 23. This effect is not indicative of a bypass because the piston 28 is in the initial position, and the controller 50 may be programmed to recognise this initial current variation as being representative of normal operation of the filter 18, such that the impending bypass signal 23BS is not emitted by this initial change in the current C. The controller 50 may be programmed to emit a no-bypass signal when the magnetic sensor 23 experiencing the initial current variation, where the no-bypass signal is indicative of normal operation of the filter 18. Alternatively, the controller 50 may be programmed to emit no signal when experiencing the initial current variation.

As the filter 18 becomes blocked or malfunctions, the pressure build up of the fluid 11 in the wet portion 24A will cause the piston head 28A to displace in the direction D1. This will also displace the magnet 25 in the direction D1 to the second position that is indicative of an impending bypass. In the second position of the piston 28, the magnet 25 also lies in the same plane as the magnetic sensor 23. However, the polarity of the magnet 25 in the second position (e.g. south pole) is different from the polarity of the magnet 25 in the initial position. As the magnet 25 with the different polarity is displaced to face the magnetic sensor 23 in the second position, the different polarity of the magnet 25 will impart an effect on the current C through the magnetic sensor 23 that is different from the effect on the current C imparted by the magnet 25 having the first polarity in the initial position. This effect is indicative of an impending bypass of the filter 18, and the controller 50 may be programmed to recognise this change in the current C from the initial current variation as being representative of an impending bypass of the filter 18, such that the impending bypass signal 23BS is emitted.

The magnet 25 and the magnetic sensor 23 have latching and non-latching functionality. An example of the latched functionality is shown in FIG. 1. The magnetic sensor 23 is latched, or "on", when it faces the magnet 25 having a first polarity (e.g., north pole in FIG. 1). The magnetic sensor 23 will remain latched, or "on", until it is exposed to a second polarity of the magnet 25 (e.g. south pole in FIG. 1) that is opposite to the first polarity, at which point the magnetic sensor 23 will turn "off" and the controller 50 will emit the impending bypass signal 23BS. A non-latching magnetic sensor 23 is one that is not dependent on a change in polarity from the magnet 25. In a non-latching functionality, the magnetic sensor 23 is in one of the states "on/off" and changes to the other state "off/on" when exposed to the magnetic field of the magnet 25, irrespective of its polarity. In a similar non-latching functionality, the magnetic sensor 23 is in one of the states "on/off" and changes to the other state "off/on" when the magnetic field of the magnet 25 is removed from the magnetic sensor 23, irrespective of its polarity. The change in the state of the magnetic sensor 23 results in the emission of the impending bypass signal 23BS by the controller 50.

It will thus be appreciated that the displacement of the magnet 25 away from the initial position changes a polarity of the magnet 25 to which the magnetic sensor 23 is exposed. The magnetic sensor 23 is thus able to detect when a fluid differential pressure is applied to the piston 28 when the magnetic polarity of the magnet 25 facing the magnetic sensor 23 changes, indicating a filter impending bypass. In the configuration of FIG. 1, the magnetic sensor 23 is initially exposed a first polarity, then the piston 28 displaces, and the magnetic sensor 23 is exposed to the opposite polarity.

Changes in the polarity of the magnet 25 between the initial position and second position may be achieved in different ways. For example, and referring to FIG. 1, the magnet 25 has a "dual magnet" configuration. The magnet 25 includes a first magnet 25A mounted to the piston 28 and having a first polarity, and a second magnet 25B also mounted to the piston 28 and having a second polarity opposite to the first polarity. Both the first and second magnets 25A,25B are ring magnets mounted about the piston rod 28B to be displaced with the piston rod 28B between the initial and second positions. In the initial position, the first magnet 25A with the first polarity lies in the same plane as the magnetic sensor 23. In the second position, the second magnet 25B with the second, opposite polarity also lies in the same plane as the magnetic sensor 23.

The first magnet 25A is spaced apart along a direction parallel to the longitudinal axis 26A from the second magnet 25B, such that a hysteresis gap HG is defined between the first and second magnets 25A,25B. The height of the hysteresis gap HG (i.e. a distance measured parallel to the longitudinal axis 26A between the first and second magnets 25A,25B) may be selected in order to provide or optimise parameters of the IBS 20. For example, varying the size of the hysteresis gap HG may impact the effect that the changing polarity of the first and second magnets 25A,25B has on the current C through the magnetic sensor 23. For example, varying the size of the hysteresis gap HG may impact the pressure differential across the piston head 28A needed to trigger a warning of impending bypass. A large hysteresis gap HG may result in only relatively large pressure differentials across the piston head 28A causing its displacement and thus triggering the impending bypass signal 23BS. Conversely, a smaller hysteresis gap HG may result in a more sensitive IBS 20, which emits the impending bypass signal 23BS from relatively small pressure differentials across the piston head 28A.

FIG. 1 shows one possible configuration for the opposite polarities of the first and second magnets 25A,25B. The first ring magnet 25A has a north pole at a radially outer periphery of the first magnet 25A, where the radial direction is defined relative to the longitudinal axis 26A. The first ring magnet 25A has a south pole at a radially inner portion of the first magnet 25A adjacent to the piston rod 28B. The second ring magnet 25B has a south pole at a radially outer periphery of the second magnet 25B, and has a north pole at a radially inner portion of the second magnet 25B adjacent to the piston rod 28B. The opposite polarities of the first and second magnets 25A,25B are aligned in an axial direction with respect to the longitudinal axis 26A. This axial alignment creates an attraction force between the first and second magnets 25A,25B across the hysteresis gap HG, which helps to prevent the first and second magnets 25A,25B from rotating the piston rod 28B about the longitudinal axis 26A.

In another possible configuration for the opposite polarities of the magnet 25, an example of which is shown in FIG. 4, the magnet 25 is a single magnet 25 lying substantially in a plane perpendicular to the longitudinal axis 26A. In the initial position of the piston 28, the single magnet 25 with its polarity lies in the same plane as the magnetic sensor 23. As the single magnet 25 is displaced to the second position away from the magnetic sensor 23 by the piston 28 in response to fluid pressure buildup, the polarity of the single magnet 25 ceases to exert an effect on the current C through the magnetic sensor 23. The absence of a magnetic field, or a reduction in the magnetic flux, causes the current C to change and to flow uninhibited through the magnetic sensor 23. This change in the current C can also be measured or detected by the controller 50, and used to emit the impending bypass signal 23BS. Thus, in this configuration, the "opposite" polarity of the single magnet 25 is the absence of any effect on the current C by the magnetic field of the single magnet 25. This is an example of a non-latching functionality of the magnetic sensor 23 and the magnet.

In yet another possible configuration for the opposite polarities of the magnet 25, the magnet 25 is a single magnet 25 that extends axially relative to the longitudinal axis 26A. The single magnet 25 is an elongated ring. A first end of the single magnet 25 has a first polarity (e.g. north pole) and the second end of the single magnet 25 spaced axially apart from the first end has a second, opposite polarity (e.g. south pole). In the initial position of the piston 28, the single magnet 25 with its first polarity lies in the same plane as the magnetic sensor 23. As the single magnet 25 is displaced to the second position away from the magnetic sensor 23 by the piston 28 in response to fluid pressure buildup, the second polarity at the second end of the single magnet 25 arrives in the same plane as the magnetic sensor 23. The different polarity of the single magnet 25 in the second position will impart an effect on the current C through the magnetic sensor 23 that is different from the effect on the current C imparted by the single magnet 25 having the first polarity in the initial position. The controller 50 may be programmed to recognise this change in the current C from the initial current variation as being representative of an impending bypass of the filter 18, such that the impending bypass signal 23BS is emitted. This is an example of a latching functionality of the magnetic sensor 23 and the magnet 25.

In yet another possible configuration for the opposite polarities of the magnet 25, the magnet 25 is a single magnet 25. In the initial position, the single magnet 25 is axially spaced apart from the plane of the magnetic sensor 23 such that magnetic field exerts little or no effect on the current C through the magnetic sensor 23. The current C thus flows substantially uninhibited through the magnetic sensor 23 in the initial position. As the single magnet 25 is displaced by the piston 28 in response to fluid pressure buildup, it is displaced to the second position where it lies in the same plane as the magnetic sensor 23. The single magnet 25 with its polarity in the second position exerts an effect on the current C and causes the current C to change through the magnetic sensor 23. This change in the current C can be measured or detected by the controller 50, and used to emit the impending bypass signal 23BS.

One possible operation of IBS 20 is now described in greater detail with reference to FIG. 1. During normal, unblocked operation of the filter 18, the fluid 11 is pumped by the pump 16 through the fluid line inlet 14A to the filter 18, and to the wet portion 24A of the interior 24 of the IBS 20 via the fluid inlet 22A. Since the filter 18 is functioning normally, the fluid 11 continues to flow through the filter 18 and is prevented from increasing the fluid pressure in the wet portion 24A high enough to cause displacement of the piston head 28A in the direction D1. The magnet 25 will thus remain in its initial or default position, and the controller 50 may be programmed to emit the no-bypass signal which is indicative of normal operation of the filter 18.

If the filter 18 becomes partially or fully blocked, the fluid 11 will accumulate in the wet portion 24A. If enough fluid 11 accumulates in the wet portion 24A, it may be an indication that a bypass of the filter 18 is imminent or impending. As the fluid pressure increases in the wet portion 24A to an amount indicative of an impending bypass, the pressure differential across the piston head 28A will cause the piston 28 to displace in the direction D1. This will in turn displace the magnet 25 to the second position that is indicative of an impending bypass of the filter 23. The change in the current C flowing through the magnetic sensor 23 caused by the displacement of the magnet 25 will cause the controller 50 to emit the impending bypass signal 23BS.

If the filter 18 is not repaired or replaced and becomes more blocked, it may be desirable for the fluid 11 to bypass the filter 18 in order to maintain operation of components downstream of the fluid filter system 10. In such a situation, the increasing fluid pressure in the wet portion 24A will further displace the piston head 28A in the direction D1 to a bypass position. In the bypass position, the piston head 28A exposes or unblocks the fluid outlet 22B of the housing 26. The alternative to the bypass position is the closed position, in which the piston head 28A blocks the fluid outlet 22B and prevents the fluid 11 from being conveyed to the fluid outlet 22B. In the bypass position, the fluid outlet 22B is in fluid communication with the fluid inlet 22A via the interior 24, such that a bypass flow path for the fluid 11 is formed through the IBS 20. The fluid 11 is thus able to bypass the filter 18 by flowing through the IBS 20, through the bypass line 22C, and arriving at the fluid line outlet 14B downstream of the blocked filter 18. Thus, in an embodiment, the IBS 20 itself allows the fluid 11 to bypass the filter 18, in addition to warning of the bypass of the filter 18.

The IBS 20 may also include other features in addition to those disclosed herein. For example, and referring to FIG. 1, the actuation pressure adjustment 27A is secured to a fixed portion of the housing via another locknut 27B, and can be adjusted to set the level of desired dampening on the spring 28D. A connector 27C may be provided to route wiring into the dry portion 24B of the interior 24, such as to an amplification PCB 27D which helps to provide EMI and lightning protection to the IBS 20. A retaining ring 27E may be fixedly mounted or inserted within an annular groove extending into the annular wall 26B from the inner surface 26B1, and may engage with the movement limiter 26M to prevent additional axial displacement of the piston 28.

Referring to FIG. 1, there is disclosed a method of signaling an impending bypass of the filter 18. The method includes displacing the magnet 25 due to fluid pressure build up caused by a blockage of the filter 18 relative to the magnetic sensor 23 having the current C flowing therethrough. Displacement of the magnet 25 adjacent to the magnetic sensor 25 changing the current C through the magnetic sensor 23. The method includes emitting a signal 23BS indicative of the impending bypass of the filter 18 in response to the change in current C through the magnetic sensor 23. The emitting may be done by the controller 50.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the IBS 20 may be used to warn of an impending bypass of another component, such as a valve, caused by a blockage or malfunction of the other component. The IBS 20 may thus be used to warn of an impending bypass of other components as well. In another example, the IBS 20 may also be used to signal an occurring bypass, in addition to signalling an impending bypass. Yet further modifications could be implemented by a person of ordinary skill in the art in view of the present disclosure, which modifications would be within the scope of the present technology.

The invention claimed is:

1. An impending bypass switch (IBS) for a fluid filter, comprising:
 a housing having a fluid inlet for admitting fluid into an interior of the housing;
 a piston displaceable in the interior of the housing in response to a pressure variation of the fluid in the interior, the piston calibratable to displace in response to a predetermined pressure differential indicative of a blockage of the fluid filter, the predetermined pressure differential adjustable via an actuation pressure adjustment secured to the housing;
 a magnetic sensor configured to receive a current and fixedly mounted to the housing; and
 a magnet mounted to the piston to be displaced with the piston, displacement of the magnet relative to the magnetic sensor causing a change in the current through the magnetic sensor, the change in the current indicative of an impending bypass of a component;
 wherein the magnetic sensor is a solid state magnetic flux sensor, the current through the magnetic sensor changing in response to changes in a magnetic field from the magnet.

2. The IBS of claim 1, wherein the magnetic sensor is a Hall effect sensor.

3. The IBS of claim 1, wherein the magnetic sensor is a magnetoresistive sensor.

4. The IBS of claim 1, wherein the piston is displaceable between an initial position and a second position spaced apart from the initial position, the second position indicative of the impending bypass, the magnet in the initial position having a first polarity, and the magnet in the second position having a second polarity opposite to the first polarity.

5. The IBS of claim 1, wherein the magnetic sensor is fixedly mounted to an internal wall of the housing, the internal wall delimiting the interior of the housing.

6. The IBS of claim 1, wherein the housing includes a fluid outlet for conveying the fluid from the interior, the piston displaceable in the interior between a closed position and a bypass position, the fluid outlet in the bypass position being in fluid communication with the fluid inlet via the interior.

7. The IBS of claim 1, wherein the piston includes a piston head and a piston rod extending from the piston head, the magnet mounted to the piston rod and sealed from the fluid in the interior of the housing.

8. The IBS of claim 1, wherein the piston includes a piston head and a piston rod extending from the piston head, a seal fixedly mounted to the housing and dividing the interior into a fluid portion and a dry portion, the magnet mounted to the piston rod in the dry portion of the interior.

9. The IBS of claim 1, wherein the magnet includes a first magnet mounted to the piston and having a first polarity, the magnet including a second magnet mounted to the piston and having a second polarity opposite to the first polarity, the first magnet spaced apart from the second magnet across a hysteresis gap, displacement of the first and second magnets relative to the magnetic sensor causing the change in the current through the magnetic sensor.

10. The IBS of claim 1, wherein the piston is displaceable between an initial position and a second position spaced apart from the initial position, the second position indicative of the impending bypass:
 the magnet in the initial position having a first polarity and aligned with the magnetic sensor across a gap, the current through the magnetic sensor in the initial position indicative of no bypass of the component a no-bypass signal; and
 the magnet in the second position having a second polarity opposite to the first polarity and aligned with the magnetic sensor across the gap, the current through the magnetic sensor in the second position indicative of the impending bypass of the component.

11. A fluid filter system, comprising:
 a fluid line including a fluid inlet line for conveying a fluid under pressure to a fluid filter, and a fluid outlet line for conveying the fluid downstream of the fluid filter; and
 an impending bypass switch (IBS), comprising:
  a housing having a fluid inlet in fluid communication with the fluid inlet line for admitting the fluid into an interior of the housing, the housing having a fluid outlet in fluid communication with the fluid outlet line;
  a piston displaceable in the interior of the housing in response to a pressure variation of the fluid in the interior, the piston calibratable to displace in response to a predetermined pressure differential indicative of a blockage of the fluid filter, the predetermined pressure differential adjustable via an actuation pressure adjustment secured to the housing; and
  a magnetic sensor configured to receive a current and fixedly mounted to one of the housing and the piston; and
  a magnet mounted to the other of the housing and the piston, displacement of the magnet relative to the magnetic sensor causing a change in the current through the magnetic sensor, the change in the current indicative of an impending bypass of the fluid filter;
  wherein the magnetic sensor is a solid state magnetic flux sensor, the current through the magnetic sensor changing in response to changes in a magnetic field from the magnet.

12. The fluid filter system of claim 11, wherein the magnetic sensor is one of a Hall effect sensor and a magnetoresistive sensor.

13. The fluid filter system of claim 11, wherein the piston is displaceable between an initial position and a second position spaced apart from the initial position, the second position indicative of the impending bypass, the magnet in the initial position having a first polarity, and the magnet in the second position having a second polarity opposite to the first polarity.

14. The fluid filter system of claim 11, wherein the magnetic sensor is fixedly mounted to an internal wall of the housing, the internal wall delimiting the interior of the housing.

15. The fluid filter system of claim 11, wherein the piston includes a piston head and a piston rod extending from the piston head, the magnet mounted to the piston rod and sealed from the fluid in the interior of the housing.

16. The fluid filter system of claim 11, wherein the magnet includes a first magnet mounted to the piston and having a first polarity, the magnet including a second magnet mounted to the piston and having a second polarity opposite to the first polarity, the first magnet spaced apart from the second magnet across a hysteresis gap, displacement of the first and second magnets relative to the magnetic sensor causing the change in the current through the magnetic sensor indicative of the impending bypass of the fluid filter.

17. The fluid filter system of claim 11, further comprising an amplification printed circuit board (PCB) operable to provide electromagnetic interference (EMI) and lightning protection to the IBS.

18. A method of signaling an impending bypass of a filter, the method comprising:
    setting, via an actuation pressure adjustment, a predetermined pressure differential indicative of a blockage of the filter;
    displacing a magnet due to fluid pressure build up caused by the blockage of the filter relative to a solid state magnetic flux sensor having a current flowing therethrough, displacement of the magnet adjacent to the magnetic sensor changing the current through the magnetic sensor; and
    emitting a signal indicative of the impending bypass of the filter in response to the change in current through the solid state magnetic flux sensor.

19. The method of claim 18, wherein displacing the magnet includes displacing the magnet from an initial position in which the magnet has a first polarity to a second position in which the magnet has a second polarity opposite to the first polarity, the magnet in the second position changing the current through the solid state magnetic flux sensor.

20. The method of claim 18, wherein displacing the magnet includes displacing a first magnet and a second magnet from an initial position to a second position, the first and second magnets having opposite polarities, the second magnet in the second position changing the current through the solid state magnetic flux sensor.

\* \* \* \* \*